United States Patent [19]

Manduley

[11] Patent Number: 5,737,423
[45] Date of Patent: Apr. 7, 1998

[54] OLD MODIFIED SMART CARD OR SIMILAR APPARATUS HAVING A REMOTE INSPECTION CAPABILITY

[75] Inventor: Flavio M. Manduley, Woodbury, Conn.

[73] Assignee: Pitney Bowes Inc., Stamford, Conn.

[21] Appl. No.: 518,212

[22] Filed: Aug. 23, 1995

[51] Int. Cl.[6] .................................................. H04L 9/00
[52] U.S. Cl. .................................................. 380/25; 380/49
[58] Field of Search ..................... 455/68, 70; 340/539, 340/546; 235/380, 384; 380/25, 49

[56] References Cited

U.S. PATENT DOCUMENTS

| | | | |
|---|---|---|---|
| 4,845,740 | 7/1989 | Tokuyama | 379/91 |
| 4,868,900 | 9/1989 | McGuire | 235/380 |
| 4,891,503 | 1/1990 | Jewell | 235/380 |
| 4,908,521 | 3/1990 | Boggan | 235/380 |
| 5,351,187 | 9/1994 | Hassett | 364/401 |
| 5,376,778 | 12/1994 | Kreft | 235/382 |
| 5,382,778 | 1/1995 | Takahira | 235/380 |
| 5,412,192 | 5/1995 | Hoss | 235/380 |

OTHER PUBLICATIONS

Bruce Schneier, Applied Cryptography:Protocols,Algorithms and Source Code in C, 2nd Edition, 1996, p. 587.

Primary Examiner—Thomas H. Tarcza
Assistant Examiner—Carmen D. White
Attorney, Agent, or Firm—Robert H. Whisker; Melvin J. Scolnick; Robert Meyer

[57] ABSTRACT

An apparatus and method for remote inspection of a smart card or similar apparatus. A smart card includes an antenna and receiver for receiving transmitted messages and a display. The smart card responds to a response request message to display a secure output message prompting a user of the smart card to respond to the party originating the message. When a valid response is received a response confirmation message is transmitted to the smart card. If a response is not received or is invalid a deactivate command message is transmitted to the smart card. If a response request message is not received within a first time period, or if a response confirmation is not received within a second time period after a response request is received, or if an attempt is made to use the card after a response request is received and before a response confirmation is received, the card will deactivate itself.

16 Claims, 5 Drawing Sheets

OLD MODIFIED SMART CARD OR SIMILAR APPARATUS HAVING A REMOTE INSPECTION CAPABILITY

BACKGROUND OF THE INVENTION

The subject invention relates to modified smartcards or similar apparatus which include a microprocessor and are intended for information exchange transactions. More particularly, it relates to such apparatus which include a capability for remote inspection and possible subsequent deactivation.

Smart cards are well known and in generally comprise a plastic body having approximately the size, shape and appearance of a typical credit card. Embedded within the body are a microprocessing system including a memory and processor, a power source and an input/output mechanism. When connected to an appropriate card reader a smart card can be used for secure information exchange transactions. In particular, it has frequently been suggested that a smart card can be used as an "electronic purse". In such "electronic purse" applications a smart card would be "filled" or "charged" with electronic tokens representative of a monetary value by an issuing authority such as a bank. Such tokens could then be transferred from the smart card to a vendor having an appropriate card reader as payment for goods or services. A vendor would then download electronic tokens received to an issuing authority, which would then credit the vendor's account.

While such smart cards may prove to be satisfactory for there intended purpose, they suffer from the disadvantage that the issuing authority has little, if any, control over a card once it is issued. In an effort to provide at least some such control, U.S. Pat. No. 5,412,192; to: Hoss; for RADIO FREQUENCY ACTIVATED CHARGE CARD; issued: May 2, 1995 teaches a charge card which includes an antenna, a radio receiver, and a mechanism responsive to transmitted messages for changing the card appearance or information contained within the card so as to change the status of the card (e.g. from "active" to "inactive").

While Hoss does teach a card where the issuing authority does have some degree of control over the status of the card, Hoss is limited in that it does not provide any mechanism for the issuing authority to determine anything about the transaction history of the card, nor does it provide any means for assuring that a person responding to a broadcast message received by the card is actually in possession of the card. Thus, while Hoss does teach that a message received by the card can request that the person in possession of the card call the originator of the message, nothing in Hoss would allow the issuing authority to remotely inspect the card.

Thus it is an object of the subject invention to provide a smart card, or similar apparatus which may have the capabilities of a cellular phone or a telephone beeper system, with a capability for remote inspection and to provide a method for conducting such remote inspections.

BRIEF SUMMARY OF THE INVENTION

The above object is achieved and the disadvantages of the prior art are overcome in accordance with the subject invention by means of a portable apparatus, which can be a modified smartcard, which includes an antenna and a receiver responsive to the antenna for receiving transmitted messages. A decoder receives the transmitted messages from the receiver and decodes them both to determine the information content of a message and to determine that the message is addressed to a particular apparatus. The apparatus also includes input/output means for inputting information to, and outputting information from, the apparatus. A data processor responsive to the input/output mechanism into the decoder is also included in the apparatus. The data processor is responsive to the input/out mechanism to transact information exchanges with external devises.

In accordance with one aspect of the subject invention, where the apparatus is a modified smart card, the transactions relate to transfer of encrypted tokens representative of value to or from the smart card. The data processor is also responsive to the decoder to generate output messages on a display; and in particular the data processor is responsive to a first decoded, response request message to generate a secure output message and thereafter respond to a predetermined event to deactivate the apparatus.

In accordance with one aspect of the subject invention the output message prompts an authorized processor of the apparatus to send a response reflecting the secure output message to an originator of the response request message. (By "reflecting" herein is meant that the response is based upon the secure output message so that a valid response can only be generated with knowledge of the secure output message.)

In accordance with another aspect of the subject invention the data processor responds to a second decoded, response confirmation message to thereafter ignore occurrence of the predetermined event.

In accordance with still another aspect of the subject invention the secure message is at least partly based upon an encryption of information pertaining to a history of information exchange transactions using the apparatus and the data processor further responds to receipt of a response confirmation message to update an encryption key used to generate the encryption.

In accordance with still yet another aspect of the subject invention the predetermined event is receipt of a deactivate command message by the apparatus.

In accordance with the method of the subject invention a party wishing to remotely inspect an apparatus having a capability to decode and respond to a response request message by generating and displaying a secure output message, and also having an automatic deactivation capability, first transmits a response request message addressed to the apparatus to be inspected and then, if a message reflecting the secure output message is not received before occurrence of the predetermined event, automatically controls the apparatus to deactivate.

In accordance with one aspect of the method of the subject invention, if a message reflecting the secure output message is received before the occurrence of the predetermined event, a response confirmation message is transmitted to the apparatus, and thereafter occurrence of the predetermined event will be ignored.

Thus it can be readily seen by those skilled in the art that the above described invention achieves the above object and will advantageously overcome the limitations of the prior art. Other objects and advantages of the subject invention will be readily apparent to those skilled in the art from the detailed description of preferred embodiments set forth below.

DETAILED DESCRIPTION OF PREFERRED EMBODIMENTS OF THE SUBJECT INVENTION

Figure 1:
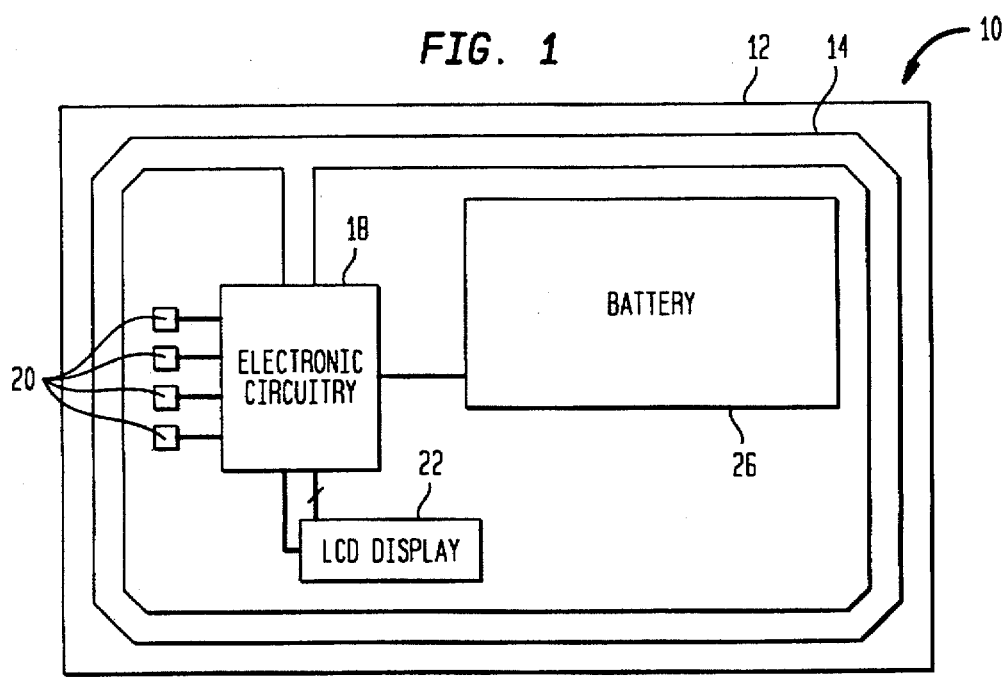
FIG. 1 is a block diagram of components of a smart card in accordance with the subject invention.

FIG. 1 shows smart card 10, which includes plastic body 12 having approximately the size, shape and form of a conventional credit card. Embedded in body 12 are antenna 14, electronic circuitry 18, contacts 20, LCD display 22, and battery 26.

Figure 2:
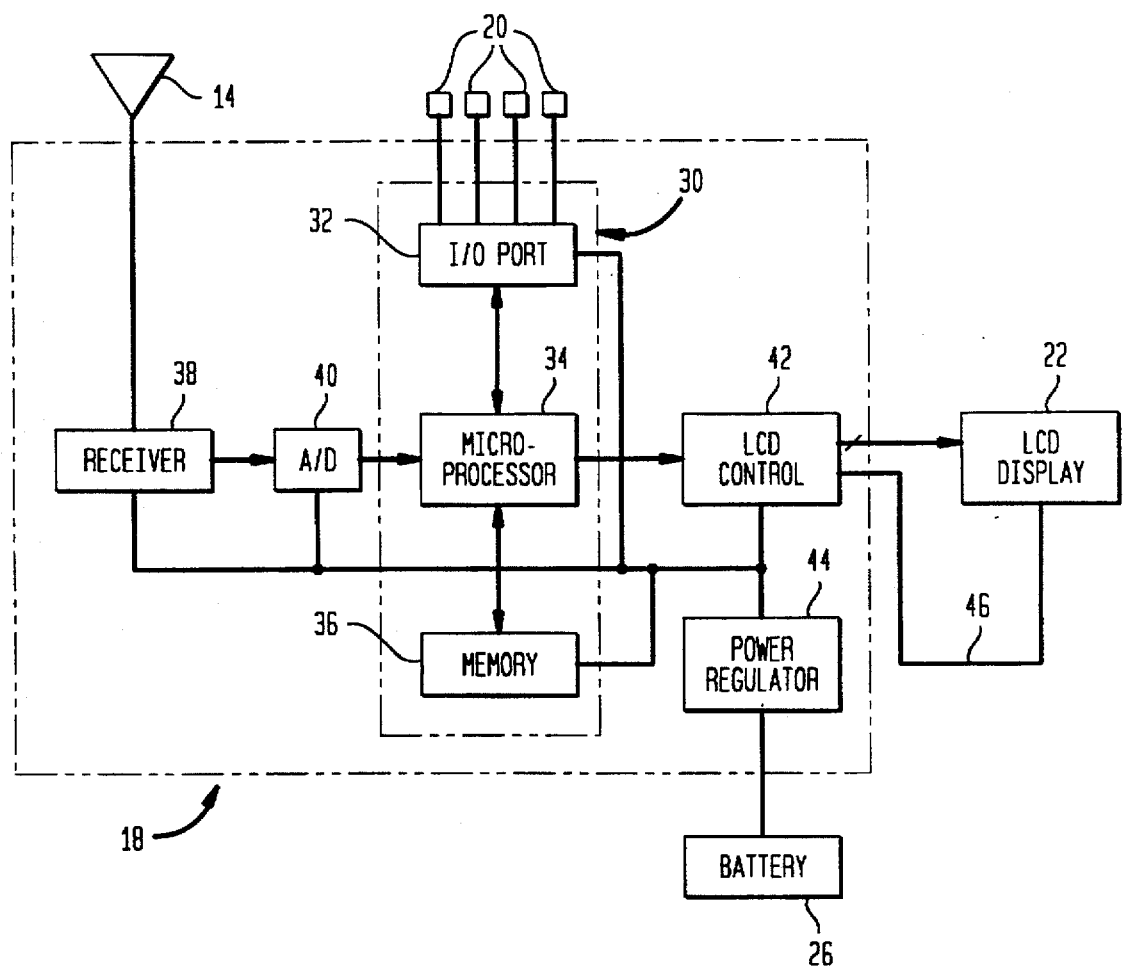
FIG. 2 is a schematic block diagram showing the relationship of functional elements of the smart card of FIG. 1.

Turning to FIG. 2, a functional black diagram of card 10 is shown. Circuitry 18 includes a data processing unit 30 comprising I/O port 32, micro processor 34 and memory 36. Preferably, a portion of memory 36 is read-only-memory for storing program instructions for controlling the operation of data processor 30 and card 10, and a portion of memory 36 is read/write memory for storing data. Preferably memory 36 includes non-volatile read/write memory for storing critical data such as encrypted tokens representing value.

Contacts 20 are connected to micro processor 34 through I/O port 32 to conduct information exchange transactions with external devices. Preferably, where card 10 is used as a "electronic purse", these transactions are the input and output of encrypted electronic tokens representing value to and from memory 36. (Information transaction between smart cards and external devices are well known, and indeed are the reason for which such cards exist, and details of particular types of transactions form no part per se of the subject invention.)

Circuitry 18 also includes receiver 38 and A/D converter 40. Antenna 14 is connected to receiver 38 which detects and amplifies RF signals picked up by antenna 14. The output of receiver 38 is input to A/D converter 40 which generates a stream of digital data for input to microprocessor 34. Microprocessor 34 decodes the input from A/D converter 40 both to determine if a message is addressed to card 10, and to determine the content of messages which are addressed to card 10. In other embodiments of the subject invention this decoding may be carried out by separate decoder circuitry.

When a first, response request message is decoded microprocessor 34 will control LCD display 22, through LCD control 42 to display a secure output message to prompt the possessor of card 10 to send a response reflecting the secure output message to an originator of the response request message. Thereafter, microprocessor 34 will deactivate card 10 unless a response confirmation message is received before the occurrence of a predetermined event. More particularly, microprocessor 34 will deactivate card 10 if any of a group of predetermined events occur before receipt of a response confirmation message, as will be more fully described below.

Power from battery 26 is distributed to electronic circuitry 18 through power regulator 44. Note, that power to LCD display 22 is preferably supplied through control 42 and connection 46 so that the capacity of battery 26 can be conserved by only applying power to display 22 as needed.

Figure 3:
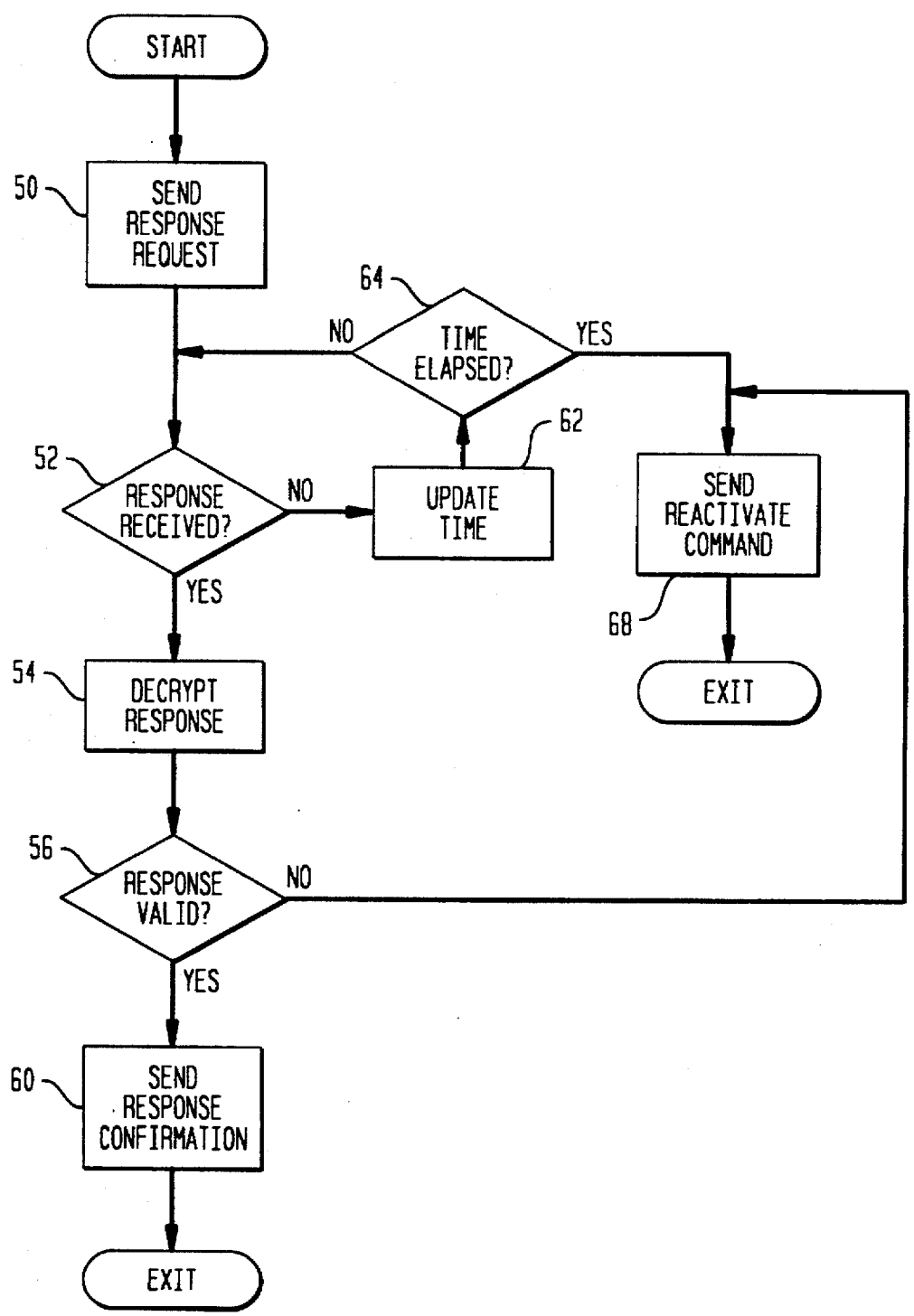
FIG. 3 is a flow diagram of transmission of messages in accordance with the subject invention.

FIG. 3 shows a flow diagram of the activity of an authority which issued card 10, or of any other party which may be authorized to inspect card 10, in conducting a remote inspection of card 10.

At 50 the issuing authority transmits a Response Request addressed to card 10, and at 52 tests to determine if a response has been received. The response may be returned in any convenient manner, but preferably will be transmitted over the telephone network by means of tone signals in a conventional manner by a person in possession of card 10.

If a response is received, then at 54 the issuing authority decrypts the response, and at 56 determines if the response is valid. The validity of the response is determined by comparing the content of the decrypted response to known information, such as a serial number stored in card 10. In a preferred embodiment of the subject invention the response will also include a password as evidence that the person returning the response is the person authorized to possess card 10. In another preferred embodiment of the subject invention the response may also include variable information reflecting the history of transactions made using card 10. For example, the response can include the amount of current value stored in card 10. By including such information the issuing authority's ability to control fraudulent use of card 10 will be greatly increased.

If the response is valid, then at 60 a Response Confirmation message is sent to card 10, completing the inspection. Preferably, the Response Confirmation message will update an encryption key used to encrypt the response so that each encrypted response received will differ from previous responses, thus assuring that the response is provided by a person actually in possession of the card. In one embodiment of the subject invention an updated encryption key may be included in the response confirmation message. To further increase the security of the system the updated key may itself be encrypted with a predetermined key stored in card 10. In another embodiment of the subject invention, card 10, and the issuing authority, may each generate the same new encryption key using a secure, predetermined psuedorandom algorithm which is not known to the public.

Updating of an encryption key as described above, or use of other known encryption techniques, validates Response Confirmation messages by assuring that Response Confirmation messages vary in a secure manner and can only be generated by the issuing authority.

If at 52 no response has been received, then at 62 the elapsed time is updated, preferably by reference to a system clock, and at 64 it is determined if a predetermined period of time has elapsed. If the predetermined time has not elapsed then the inspection operation returns to 52.

If, at 64, the predetermined time has elapsed then the issuing authority sends a deactivate command to card 10 to disable card 10 from further use and the remote inspection is completed.

Similarly, at 56 if the received response is not valid; either because the response did not decrypt properly, the password was incorrect, or because the information contained in the response was not consistent with the known history of usage of card 10 (e.g. the value in card 10 exceeded the total issued by the issuing authority to card 10) then, again at 68, the Deactivate Command is sent.

Figure 4A:
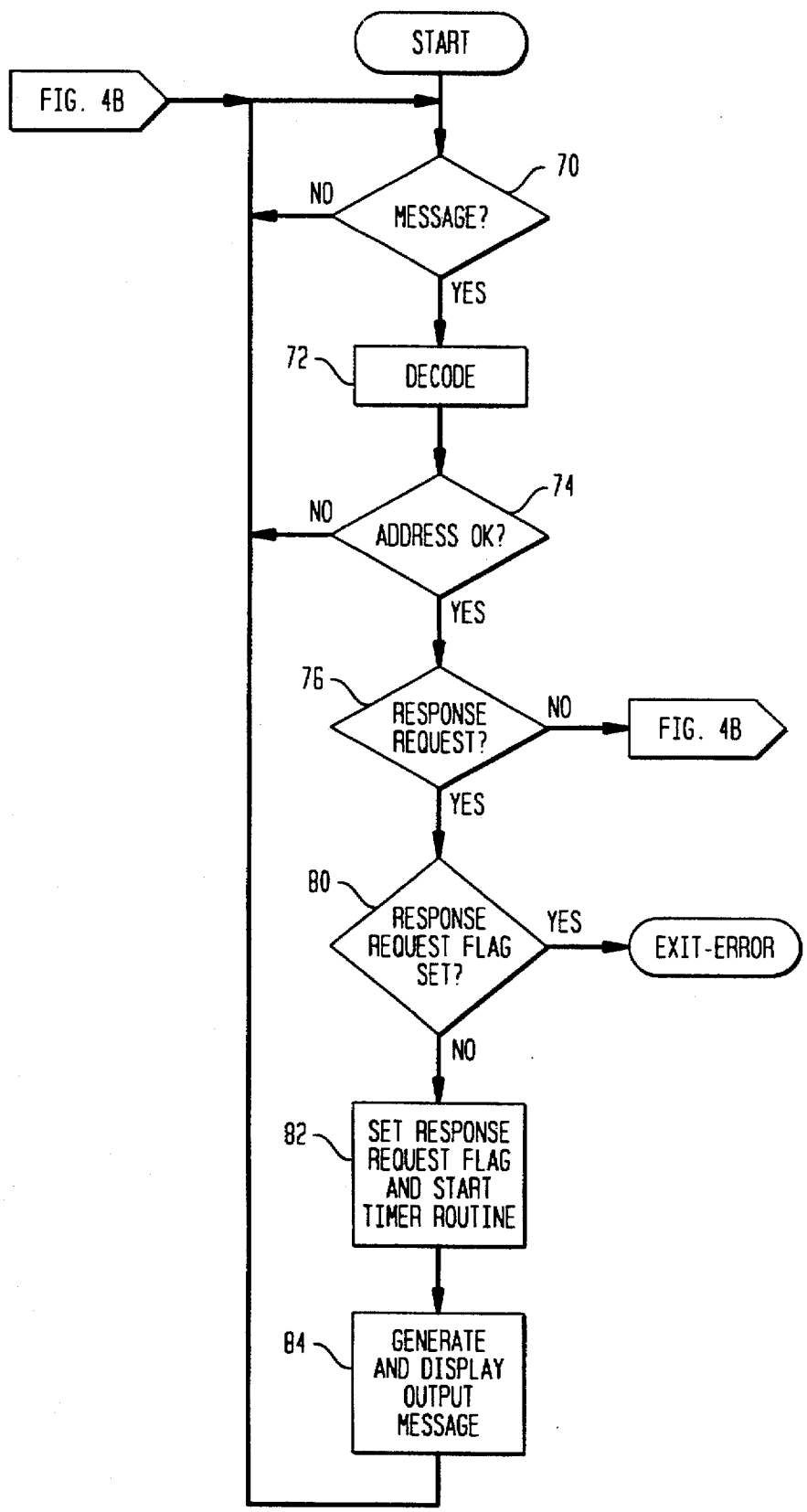
FIGS. 4a and 4b are flow diagrams of the response of the smart card of FIG. 1 in accordance with the subject invention.
Figure 4B:
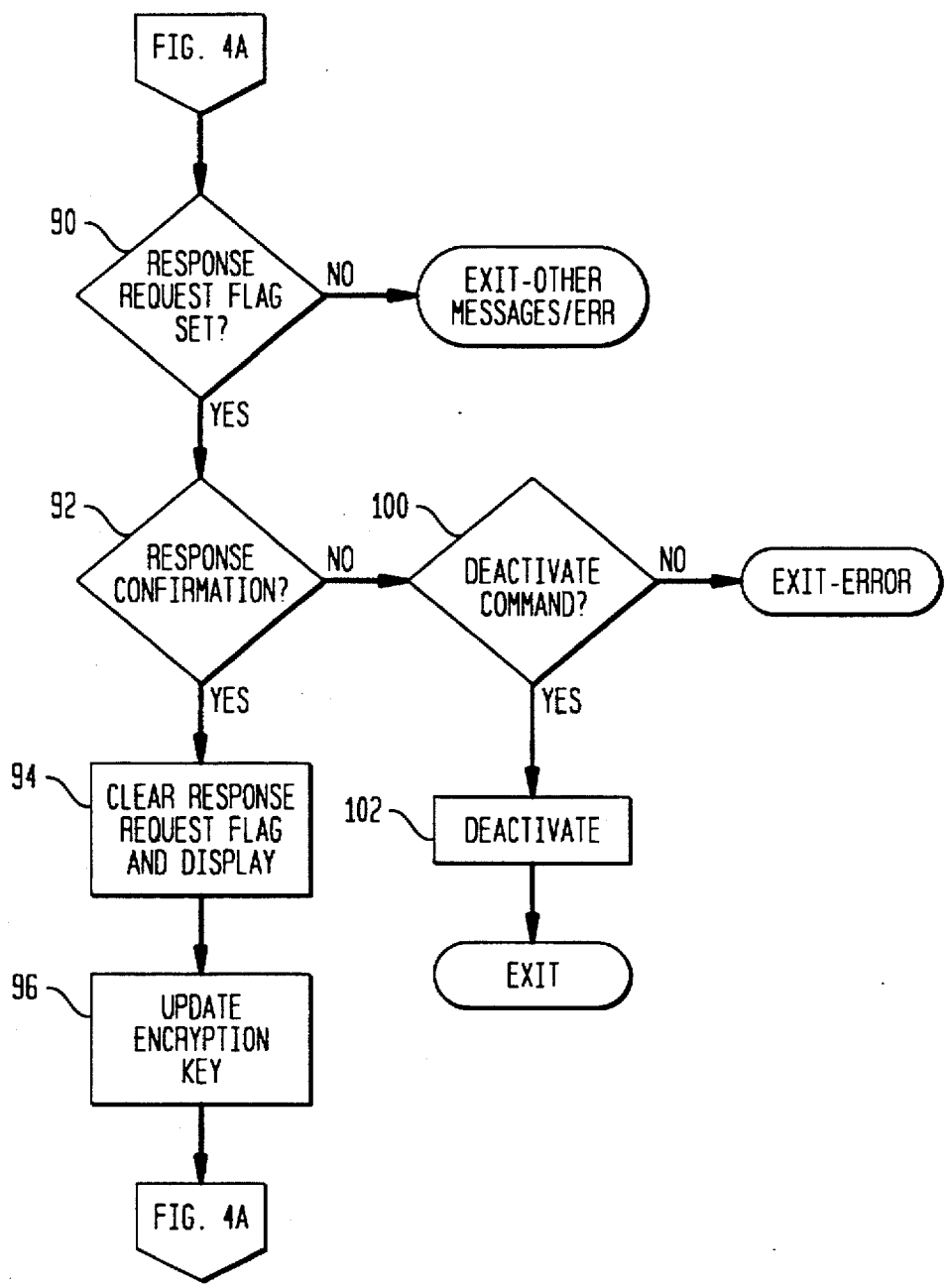

Turning to FIGS. 4A and 4B flow diagram of the operation of data processor 30 is shown.

At 70 data processor 30 tests to determine if a message has been received, and if no message has been received loops to continue testing. If a message is received, then at 72 the message is decoded. At 74 data processor 30 determines if the message is addressed to card 10, and if not returns to 70 to continue testing for a message. If the message is addressed to card 10, then at 76, data processor 30 determines if the message is a response request.

If the received message is a Response Request message, then at 80 data processor 30 tests to determine if a Response Requested flag is set. If the flag is set then data processor 30 exits to an error routine.

Assuming that the flag is not set and at 82 data processor 30 sets the Response Requested flag and starts a timer routine which runs in background (i.e. concurrently). Then, at 84, data processor 30 generates and displays an output message. The output message prompts the person possessing card 10 to send a response reflecting the output message to the issuing authority or other party generating the response request. As noted above, the output message includes encrypted information (or digitally signed information) about the history of transactions made using card 10.

Data processor 30 then returns to 70 to wait for the next message.

Returning to 76, if the message is not a Response Request then data processor 30 goes to 90 in FIG. 4B. At 90 data processor 30 determines if the Response Requested flag is set, and if not, exits to a routine to handle other messages not related to remote inspection, or to an error routine if no such other messages exists.

At 92 data processor 30 then determines if the message is a Response Confirmation message, and if so, at 94 clears the Response Requested flag and display 22, and then at 96 updates an encryption key for the generation of the next output message, as described above. Data processor 30 then returns to 70 in FIG. 4a.

Returning to 92, if the message is not a Response Confirmation message then at 100 data processor 30 determines if it is a Deactivate Command message. If it is not, then data processor 30 exists to an error routine. If the message is a Deactivate Command then at 102 data processor 30 deactivates card 10 by disabling the code needed to transact information exchanges using card 10, and exits.

If card 10 is in possession of an unauthorized person who does not know the password necessary to generate a response that unauthorized person may attempt to shield card 10 so that it cannot receive messages. To avoid this data processor 30 runs a timer routine, shown in FIG. 5, in background (i.e. concurrently) when a Response Request is received, as described above. At 110 data processor 30 tests to determine if the Response Requested flag has been set. If it has not, then at 112 data processor 30 tests to determine if a first predetermined time period has elapsed, and if not returns to 110. If the first time period elapses before the response requested flag is set, then at 114 data processor 30 deactivates card 10 by disabling code necessary to execute information exchange transactions.

When a Response Request is received data processor 30 will, at 82 in FIG. 4A set the Response Requested flag. Thus, the next time the test at 110 is executed data processor 30 will go to 116 and reset the first time period. Then at 120 data processor 30 will test the response requested flag again and, since the flag has just been set, will go to 122 to test if an attempt has been made to transact an information exchange using card 10. If such an attempt has been made then data processor 30 will deactivate card 10 at 114.

If no use is attempted then, at 124 data processor 30 will test to determine if a second predetermined time period has elapsed, and if it has go to 114 to deactivate card 10. If the second time period has not elapsed then data processor 30 returns to 120.

If the Response Requested flag is cleared (i.e. a response confirmation message is received) then at 128 data processor 30 resets the second time period and returns to 110.

Figure 5:
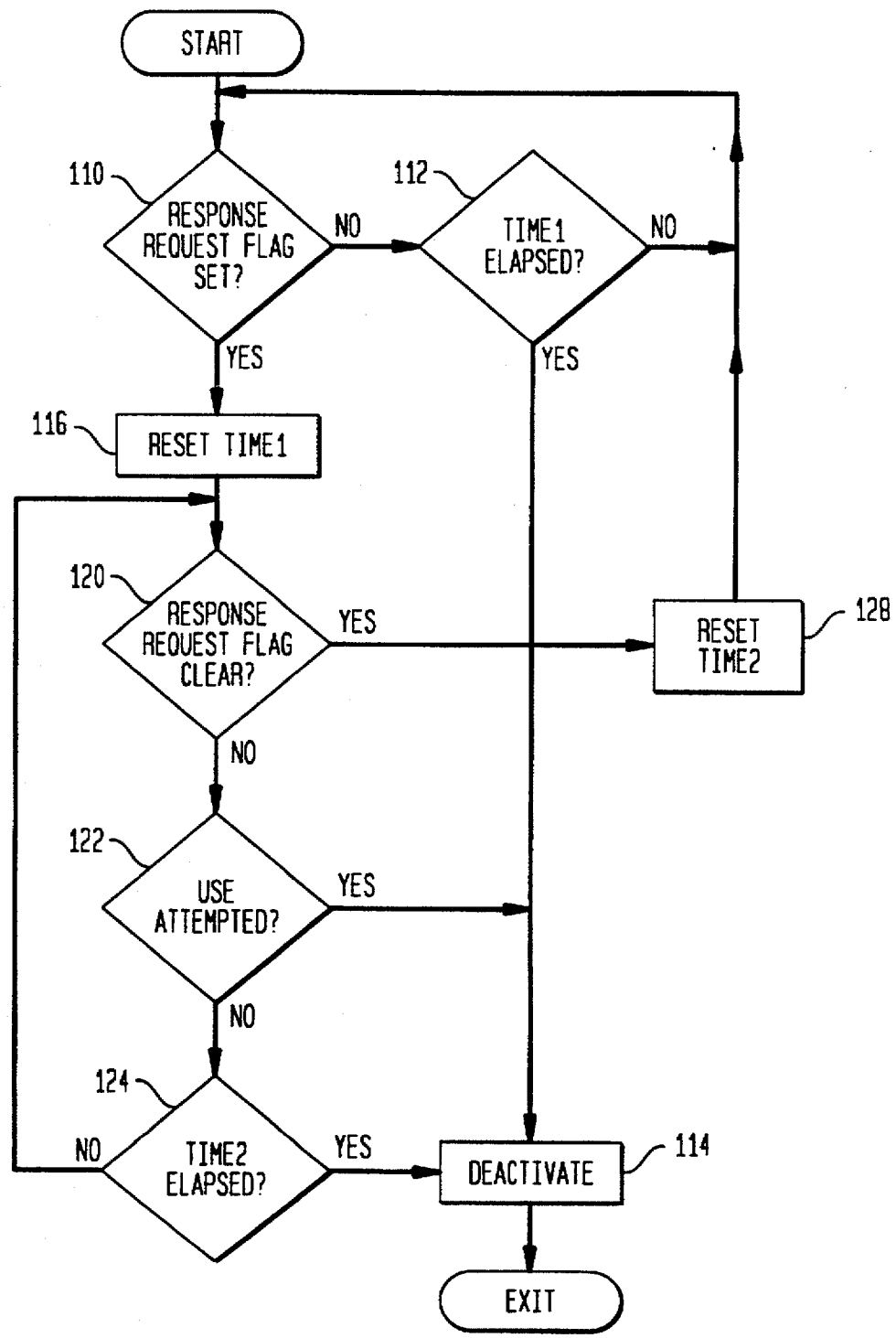
FIG. 5 is a more detailed flow diagram of an error routine executed by the smart card of FIG. 1.

Thus the background program shown in FIG. 5 will assure that card 10 is deactivated if response requests are not received within a first predetermined time period or if a response confirmation is not received within a second predetermined time period after a Response Request is received, or if a use of the card is attempted after a Response Request is received.

Thus a person wishing to misuse card 10 cannot benefit by attempting to shield it from communication with the issuing authority.

Those skilled in the art will recognize that preferably electronic circuitry 18 and particularly microprocessor 30 will be protected against tampering in any of several conventional ways known in the smart card art to prevent an unauthorized user from obtaining encryption information needed to generate a false Response Confirmation or forcing the Response Requested flag to reset without a Response Confirmation, or otherwise defeating the security of card 10.

The above preferred embodiments have been described by way of illustration only and other embodiments of the subject invention will be apparent to those skilled in the art from consideration of the detailed descriptions set forth above and the attached drawings. Particularly, it will be apparent to those skilled in the art that the subject invention may be incorporated in other apparatus than a smart card, including such apparatus as cellular telephones and telephone pagers. Thus limitations on the subject invention are to be found only in the claims set forth below.

What is claimed:

1. A method for inspecting an apparatus, said apparatus having a capability to decode and respond to a response request message transmitted to said apparatus by generating and displaying a secure output message, and also having an automatic deactivation capability, said method comprising the steps of:

a) transmitting said response request message addressed to said apparatus, said secure output message prompting an authorized possessor of said apparatus to send a response reflecting said secure output message to an originator of said response request message;

b) if a message reflecting said secure output message is not received before the occurrence of a predetermined event, automatically controlling said apparatus to deactivate; and c. if said message reflecting said secure output message is received before the occurrence of said predetermined event, transmitting a response confirmation message addressed to said apparatus and thereafter ignoring occurrence of said predetermined event.

2. A method as described in claim 1 wherein said predetermined event is transmission of a deactivate command message addressed to said apparatus.

3. A method as described in claim 1 wherein said predetermined event is an attempt to transact an information exchange with said apparatus.

4. A method as described in claim 1 wherein said predetermined event is passage of a predetermined time interval.

5. A method as described in claim 1 wherein said secure output message comprises an encryption of information pertaining to a history of information exchange transactions using said apparatus and said apparatus responds to receipt of said response confirmation message to update an encryption key used to generate said encryption.

6. A method as described in claim 5 wherein said transactions relate to a transfer of encrypted tokens representative of value to or from said apparatus.

7. A method as described in claim 6 wherein said apparatus comprises a plastic body having a microprocessor system embedded therein.

8. A portable apparatus comprising:
   a) an antenna;
   b) a receiver responsive to said antenna for receiving transmitted messages;
   c) decoder means responsive to said receiver for decoding said transmitted messages;
   d) input/output means for inputting information to, and outputting information from, said apparatus;
   e) data processing means responsive to said input/output means for transacting information exchanges with external devices and responsive to said decoder means for generating output messages; and
   f) display means for displaying said output messages; wherein
   g) said processing means is further for:
      g1) responding to a first decoded, response request message to generate a secure output message; and
      g2) responding to a predetermined event occurring after receipt of said response request message to deactivate said apparatus; wherein
   h) wherein said output message prompts an authorized possessor of said apparatus to send a response reflecting said secure output message to an originator of said response request message; and
   i) said processing means is further for responding to a second decoded, response confirmation message to thereafter ignore occurrence of said predetermined event.

9. An apparatus as described in claim 8 wherein said secure message comprises an encryption of information pertaining to a history of information exchange transactions using said apparatus and said processing means further responds to receipt of said response confirmation message to update an encryption key used to generate said encryption.

10. An apparatus as described in claim 4 wherein said transactions relate to a transfer of encrypted tokens representative of value to or from said apparatus.

11. An apparatus as described in claim 10 wherein said apparatus is a modified smart card.

12. An apparatus as described in claim 8 wherein said predetermined event is receipt of a deactivate command message by said apparatus.

13. An apparatus as described in claim 8 wherein said predetermined event is an attempt to transact an information exchange with said apparatus.

14. An apparatus as described in claim 8 wherein said predetermined event is passage of a predetermined time interval.

15. An apparatus as described in claim 8 wherein said information exchanges relate to a transfer of encrypted tokens representative of value to or from said apparatus.

16. An apparatus as described in claim 15 wherein said apparatus is a modified smart card.

* * * * *